United States Patent Office 3,079,527
Patented Feb. 26, 1963

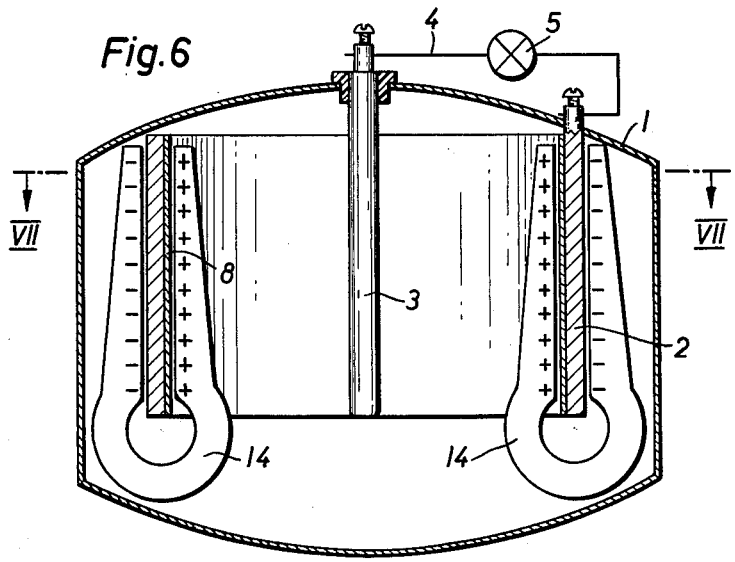
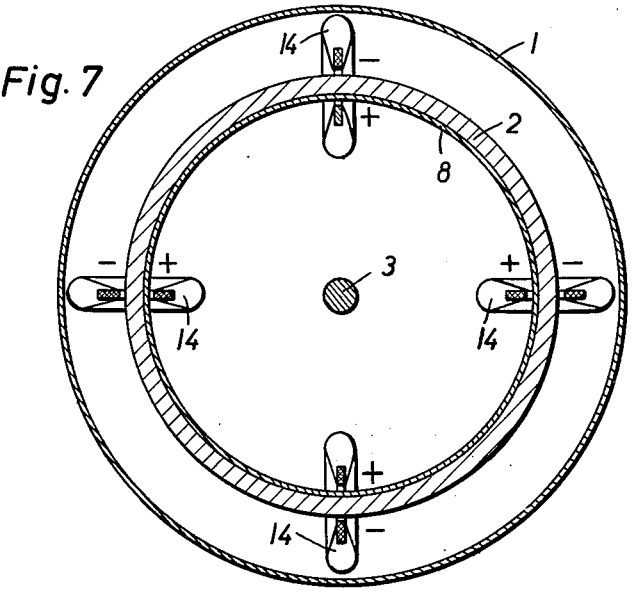

3,079,527
ARRANGEMENT FOR CONVERTING HEAT INTO ELECTRIC ENERGY
Adolf Opfermann, Hauptstr. 1–9, Bergisch-Gladbach, Germany
Filed Apr. 13, 1960, Ser. No. 22,734
Claims priority, application Germany Apr. 24, 1959
14 Claims. (Cl. 322—2)

The present invention relates to an arrangement for converting heat into electric energy.

The heretofore known arrangements of the type involved operate either in such a way that heat energy is first converted into mechanical energy and then into electric energy, or advantage is taken of the current which will result from the heating of a so-called thermocouple or thermoelement. The first mentioned method has the drawback that it requires a rather heavy and expensive installation with numerous parts which furthermore has an unsatisfactory degree of efficiency. The last mentioned method is disadvantageous inasmuch as only a very low electric output can be obtained.

It is, therefore, an object of the present invention to provide an arrangement for converting heat into electric energy, which will overcome the above mentioned drawbacks.

It is another object of this invention to provide a fundamentally new way of converting heat into electric energy.

These and other objects and advantages of the invention will appear more clearly from the following specification in connection with the accompanying drawings, in which:

FIG. 6 represents a further modification according to the invention with the electrets being horseshoe-shaped.

FIG. 7 is a section taken along the line VII—VII of FIG. 6.

General Arrangement

Figure 1:
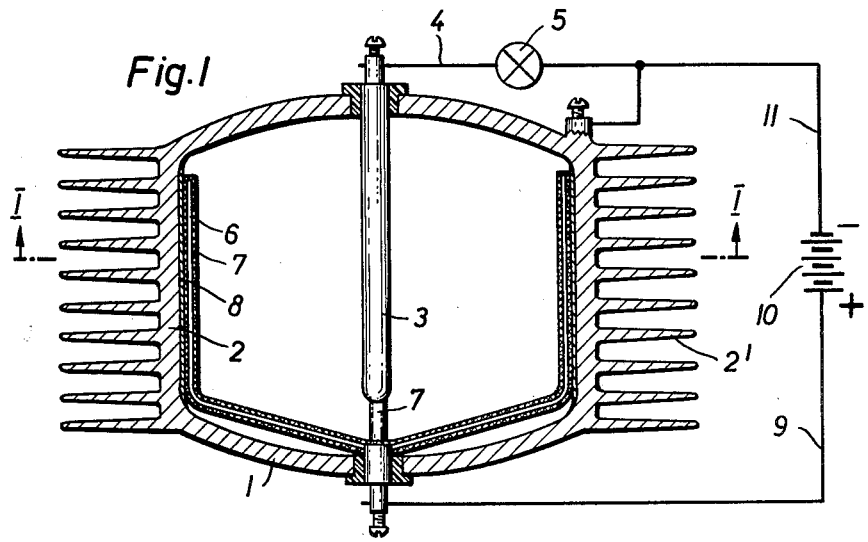
FIG. 1 is a diagrammatic illustration of an arrangement according to the present invention with a charged grid as positive charge carrier, the arrangement being shown in longitudinal section.

The problem underlying the present invention, namely to provide a completely novel way of converting heat into electric energy, has been solved according to the present invention by converting heat into electric energy by means of a high vacuum container having arranged therein a cathode and an anode, while a heat exchanger is provided for conveying the heat to be converted to the cathode, and while the anode is connected to the cathode through a consumer line. Furthermore, a positive charge carrier is arranged between the anode and the cathode near the latter.

Advantageously, the cathode is designed cylindrically while the anode is rod-shaped, said anode being located in the direction of the axis of the cathode cylinder.

According to a further development of the invention, the cathode has that side thereof which faces the anode coated with a cover adapted to facilitate the emission of electrodes, as for instance a cover of cesium oxide, or the like.

According to a further feature of the invention, the cylindrical cathode forms the wall of the high vacuum container which wall has its outer side designed as heat exchanger by being provided for instance with ribs.

According to the present invention, a grid arranged between anode and cathode and located adjacent the latter and insulated therefrom serves as positive charge carrier and is connected to the positive pole of a voltage source the negative pole of which is connected to the cathode. In this instance, it is particularly advantageous to surround the grid by an insulating sleeve or cover and to have the grid in contact with or close to the cathode.

However, also electrets may be provided as positive charge carrier, said electrets having the positive pole thereof located between anode and cathode close to the latter. In this way, a particularly simple construction of the device will be obtained.

The arrangement according to the invention may be so designed that in the consumer line there is arranged a useful current consumer so that the arrangement will operate as a heat fed current generator.

The arrangement may, according to the invention, also be so designed that the heat exchanger withdraws operating heat from a medium to be cooled so that the arrangement of the invention will operate as a cooling or refrigerating machine.

It is, of course, to be understood that the arrangement of the invention may also be so designed that the above mentioned two effects, namely current generator and refrigerating machine, may be employed simultaneously.

A further improvement of the arrangement according to the invention may be obtained by designing the anode as a hollow body for purposes of cooling and connecting the anode to a device for feeding a cooling medium. In this way, the most favorable heat drop will be continuously maintained between the cathode and the anode which may be adjusted for the optimum efficiency.

According to a particularly advantageous design of the arrangement according to the invention, the cathode is designed in form of a cylinder while the anode is designed in form of a hollow rod. In this instance, the anode is located in the direction of the longitudinal axis of the cathode cylinder. Within the hollow anode there is inserted a longitudinally extending partition dividing the hollow space into two chambers. One of these chambers communicates with a feeding line for the cooling medium, whereas the other chamber has connected thereto a discharge conduit. Those ends of the chambers which are remote from the connecting points with the feeding and discharge conduits respectively communicate with each other so that the cooling medium is introduced into one chamber at one end thereof and is conveyed to the other end into the adjacent chamber from which it is discharged again. Such an arrangement brings about a particularly effective cooling of the anode with very simple means.

*Structural Arrangement*

Figure 2:
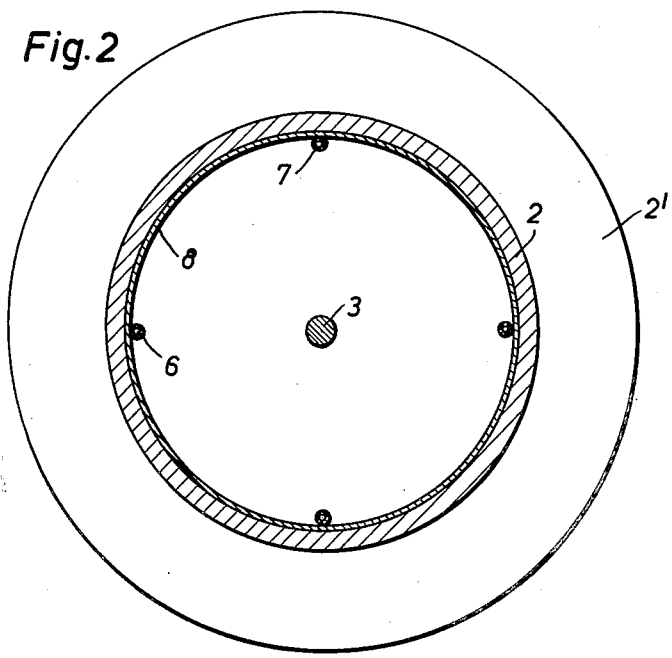
FIG. 2 represents a section taken along the line I—I of FIG. 1.

Referring now to the drawings and to FIGS. 1 and 2 thereof in detail, the high vacuum container 1 shown therein is so designed that its cylindrical wall forms a cylindrical cathode 2 having its outside provided with ribs or fins 2'. These ribs 2' act as heat exchanger and receive the heat to be converted into electric energy from a surrounding warm or hot medium and convey said heat to the cathode 2. Within the high vacuum container 1 and centrally with regard to the cylindrical cathode 2 there is provided a rod-shaped anode 3 which is electrically connected to the cathode 2 through the intervention of a consumer line 4 having interposed therein a consumer, for instance, a bulb 5. Also arranged within the container 1 is a grid 6 the metallic surfaces of which are surrounded by an insulating cover 7. The insulating cover 7 rests on the inner side of the cylindrical cathode 2. The inner side of the cylindrical cathode 2 is additionally covered or coated by a layer 8, for instance of cesium oxide or the like, for facilitating the emission of electrons. Grid 6 is electrically connected through a conductor 9 with the positive pole of a voltage source 10 the negative pole of which is electrically connected through a conductor 11 with the cathode 2. As voltage source there may be employed a battery or a Volta's column or the like. The insulating cover 7 is intended to prevent consumption of the current from the voltage source 10. When the cathode 2 is heated from the outside through the heat exchanger fins 2', the device will operate as follows:

Due to the heat movement in the cathode 2, electrons are emitted from the cathode 2 through the layer 8 facilitating the electron emission. These electrons enter the interior of the high vacuum container 1. Inasmuch as the electrons are emitted from the cathode 2 in a direction perpendicular to the surface of the cathode, they will due to electronic optical reasons collect in the center of the high vacuum container 1, i.e. on the anode 3 where they will increase the voltage so that a current will be able to flow to cathode 2 through the consumer line 4 and a possible consumer 5. Since only the fastest electrons can be emitted by the heat movement, cathode 2 will be cooled. However, through the heat exchanger fins 2' continuously further heat is conveyed to cathode 2. Therefore, provided care is taken that heat will be continuously fed to the cathode, the device can be employed as current generator for feeding the consumer 5. If there is only a certain heat reservoir available, the device according to the invention may by withdrawing heat from said heat reservoir operate as cooling or refrigerating machine for cooling the medium representing the heat reservoir.

Figure 3:
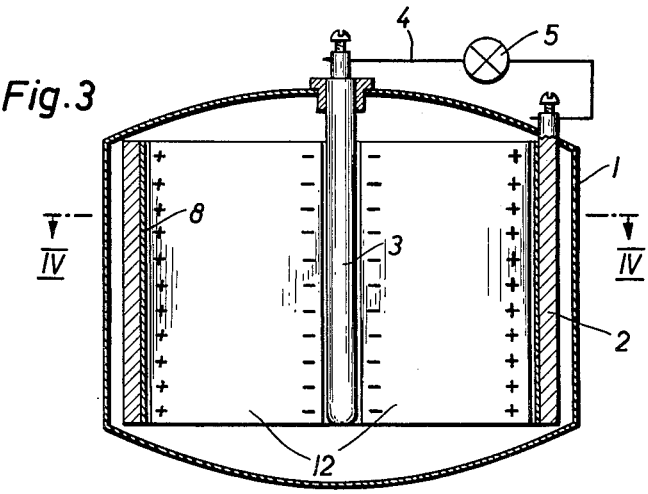
FIG. 3 shows a modified arrangement with electrets as positive charge carrier, the arrangement being shown in longitudinal section.
Figure 4:
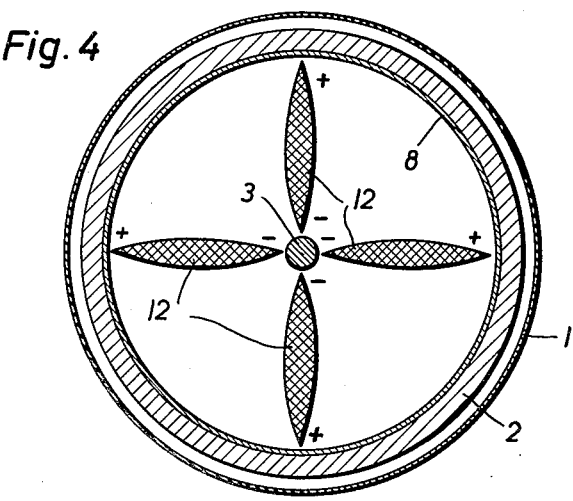
FIG. 4 is a section taken along the line IV—IV of FIG. 3.

The arrangement shown in FIGS. 3 and 4 corresponds principally to the arrangement of FIGS. 1 and 2 and, therefore, corresponding elements have been designated with the same reference numerals. The arrangement of FIGS. 3 and 4 differs from that of FIGS. 1 and 2 in that contrary to FIGS. 1 and 2 not a grid under voltage is employed as positive charge carrier but so-called electrets 12 are provided having the positive pole thereof connected to the inside of the cathode 2. Electrets are known per se and represent voltage polarized non-conductors.

The arrangement of FIGS. 3 and 4 is considerably simpler in construction than the arrangement of FIGS. 1 and 2 but does not operate quite as precisely as the arrangement of FIGS. 1 and 2.

Figure 5:
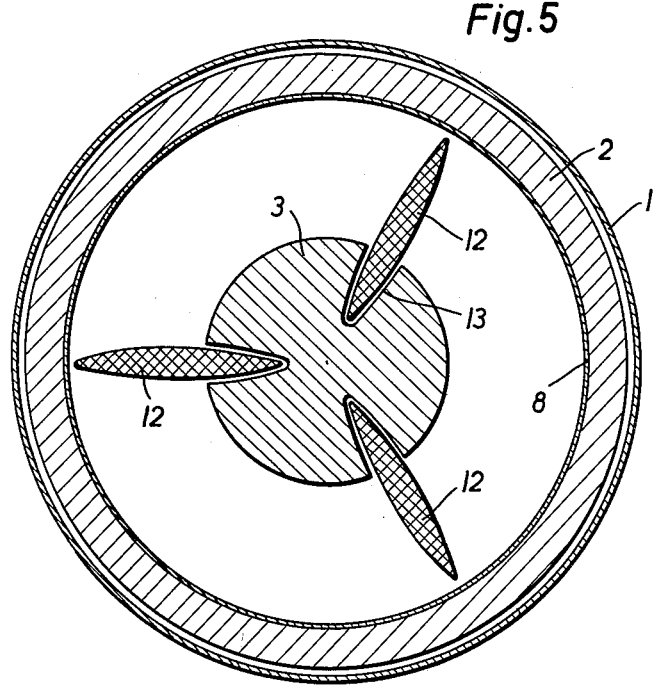
FIG. 5 represents a section similar to that of FIG. 4 but somewhat modified thereover inasmuch as the electrets are arranged in a particularly favorable manner.

FIG. 5 represents a somewhat modified and particularly advantageous arrangement of the electrets 12 in an anode 3 provided with recesses 13.

A further modification of the invention is shown in FIGS. 6 and 7, according to which said electrets 14 are designed in form of a horseshoe and have the positive pole thereof in engagement with the inner side of the cathode 2. The device according to FIGS. 6 and 7 operates in the same manner as the arrangement of FIGS. 1 to 5.

For the sake of clarity, FIGS. 3 to 7 show the cathode 2 independently of the high vacuum container 1, and the heat exchangers connected to the cathode 2 are not shown. This, however, does not mean that the cathodes 2 in FIGS. 2 to 7 are not provided with heat exchanger means.

Figure 8:
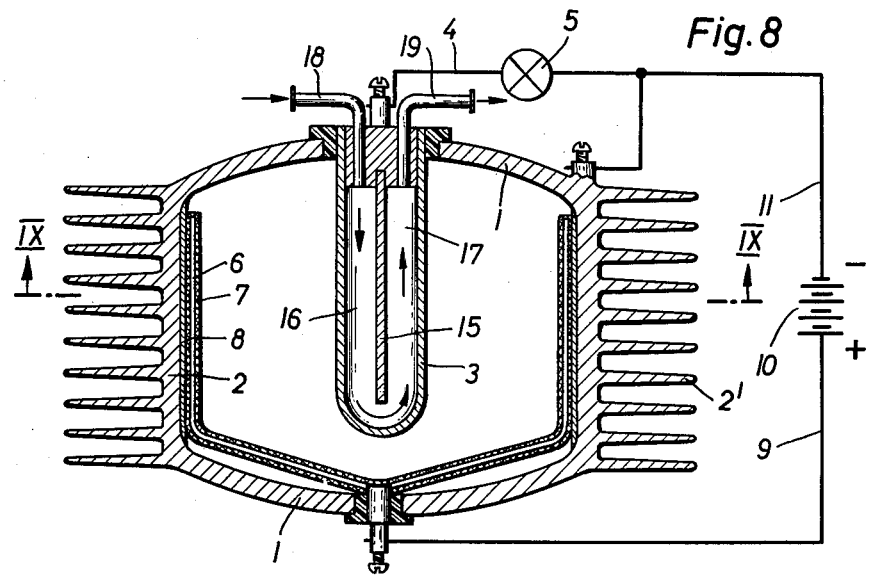
FIG. 8 illustrates a longitudinal section of a device according to the invention with charged grid as positive charge carrier and with cooled anode.
Figure 9:
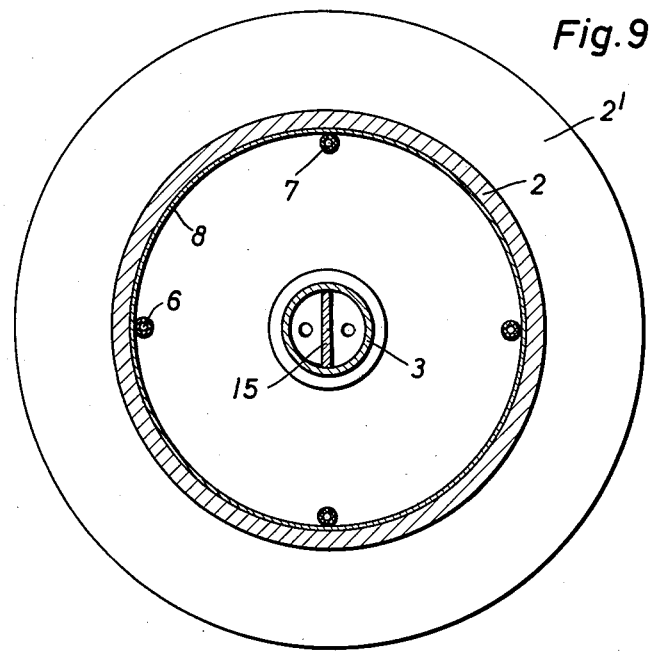
FIG. 9 is a section taken along the line IX—IX of FIG. 8.

FIGS. 8 and 9 show a high vacuum container 1 which is so designed that its cylindrical wall forms a cylindrical cathode 2 the outside of which is provided with fins 2' acting as heat exchanger and for absorbing the heat to be converted into electric energy from a warm or hot medium and conveying the thus absorbed heat to the cathode 2. Within the high vacuum container 1 and centrally located with regard to the cylindrical cathode, there is provided a rod-shaped anode 3. This anode is designed as a hollow rod and is provided with a longitudinally extending partition 15. The said partition divides the interior of rod 3 into two chambers 16 and 17. Inasmuch as the said partition 15 does not extend to the lowermost end of the rod 3, the chambers 16 and 17 communicate with each other at the lower end of the rod. At the upper end of the anode which protrudes outwardly from the vacuum container 1, there is provided an electrical connection with a line 4. Furthermore, there are provided two connections 18 and 19 of which the connection 18 serves for introducing a cooling medium, for instance a liquid such as water or oil, or a gaseous cooling medium such as air. On the other hand, the connection 19 serves for discharging said cooling medium which in conformity with the direction of the arrows has passed through the two chambers 16 and 17 and in this way has cooled the anode. The cooling medium may be brought to the desired suitable temperature so as to make sure that the corresponding cooling effect of the anode will be obtained in conformity with the respective requirements. Advantageously, a control device may be provided and connected for instance with the anode in order to maintain the latter at substantially constant temperature.

The anode 3 is electrically connected to cathode 2 through consumer line 4 which may comprise a consumer, for instance a bulb 5. Also arranged within the high vacuum container 1 is a grid 6 the metallic surfaces of which are covered by an insulating cover 7. The insulating cover 7 engages the inner side of the cylindrical cathode 2. Finally, the inner side of the cylindrical cathode 2 is advantageously coated or covered by a layer 8 which is of such a character as to facilitate the emission of electrons. Such covering layer may consist for instance of cesium oxide or the like. Grid 6 is electrically connected through a conductor 9 to the positive pole of a voltage source 10 the negative pole of which is electrically connected to the cathode 2 through a conductor 11. A battery or a Volta's column or the like may be employed as voltage source 10. The insulating cover 7 is intended to prevent the consumption of current from the voltage source 10. When cathode 2 is heated from the outside through the heat exchanger fins 2', the device will operate as follows:

Due to the heat movement in cathode 2, electrons will be emitted therefrom through the cover or layer 8 and will enter the interior of the high vacuum container 1. Inasmuch as the electrons are emitted in a direction perpendicular to the surface of cathode 2, they will due to electronical optical reasons collect in the center of the high vacuum container 1, i.e. on anode 3 where they will increase the voltage so that a current will be able to flow to cathode 2 through the consumer line 4 and consumers in said line. Inasmuch as only the fastest electrons will be emitted due to the heat movement, cathode 2 will be cooled. However, through the heat exchanger fins 2' further heat will be continuously conveyed to cathode 2. Therefore, if heat is continuously fed to the cathode, the arrangement may serve as a current generator for feeding the consumer 5. If, however, only a limited heat reservoir is available, the arrangement may due to the withdrawal of heat from the heat reservoir operate as cooling or refrigerating machine for cooling the heat reservoir.

Figure 10:
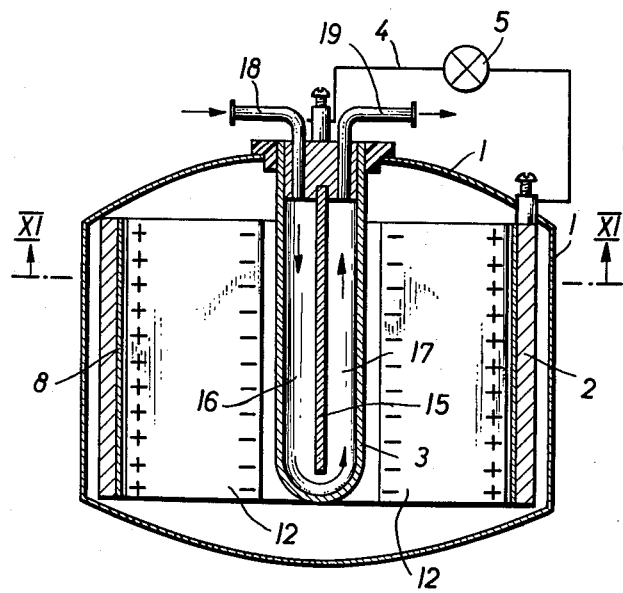
FIG. 10 is a cross section of a further modification of a device according to the invention with a cooled anode and with electrets as positive charge carrier.
Figure 11:
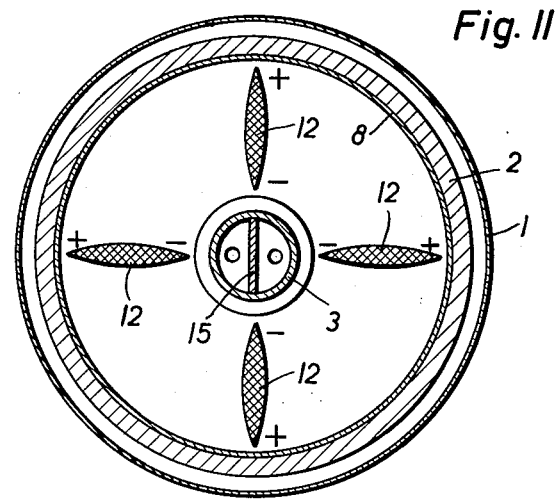
FIG. 11 is a section taken along the line XI—XI of FIG. 10.

FIGS. 10 and 11 illustrate an arrangement which corresponds substantially to the arrangement of FIGS. 8 and 9 and, accordingly, corresponding parts have been designated with the same reference numerals as in FIGS. 8 and 9.

The arrangement of FIGS. 10 and 11 differs from that of FIGS. 8 and 9 primarily in that contrary to FIGS. 8 and 9 not a grid under voltage is employed as positive charge carrier but so-called electrets 12 having the positive pole thereof connected to the inner side of cathode 2. The arrangement according to FIGS. 10 and 11 is considerably simpler in construction than the arrangement of FIGS. 8 and 9 but is not as precise in operation as the arrangement of FIGS. 8 and 9.

Also with this arrangement, the anode is cooled in the manner described above in connection with FIGS. 8 and 9.

Figure 12:
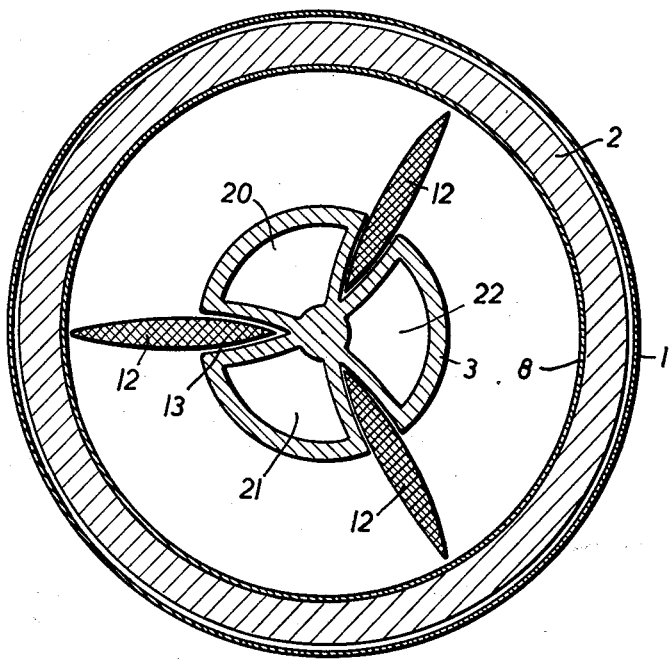
FIG. 12 represents an arrangement somewhat similar to that of FIG. 11 but differing therefrom inasmuch as it comprises a particularly effective cooling system for the anode and a particularly advantageous arrangement of the electrets.
Figure 12A:
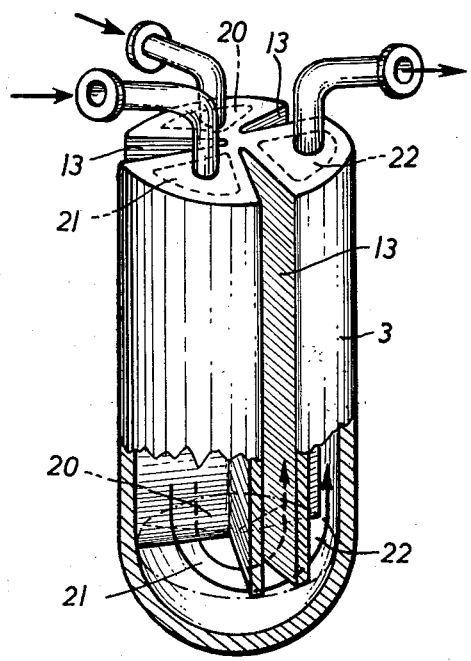

FIG. 12 shows a modification of a particularly advantageous arrangement of the electrets 12 in an anode 3 provided with recesses 13. In an advantageous manner, also with this embodiment, the anode 3 is designed as a hollow body and expediently comprises three longitudinally extending chambers 20, 21 and 22. Advantageously, the chambers 20 and 21 are connected to a feeding line for the cooling medium, whereas chamber 22 is connected with a discharge conduit for the cooling medium. At the lower end of the anode, the chambers are connected to each other in a manner described in connection with FIG. 8 so that the cooling medium will be able to pass from chambers 20 and 21 to chamber 22.

Figure 13:
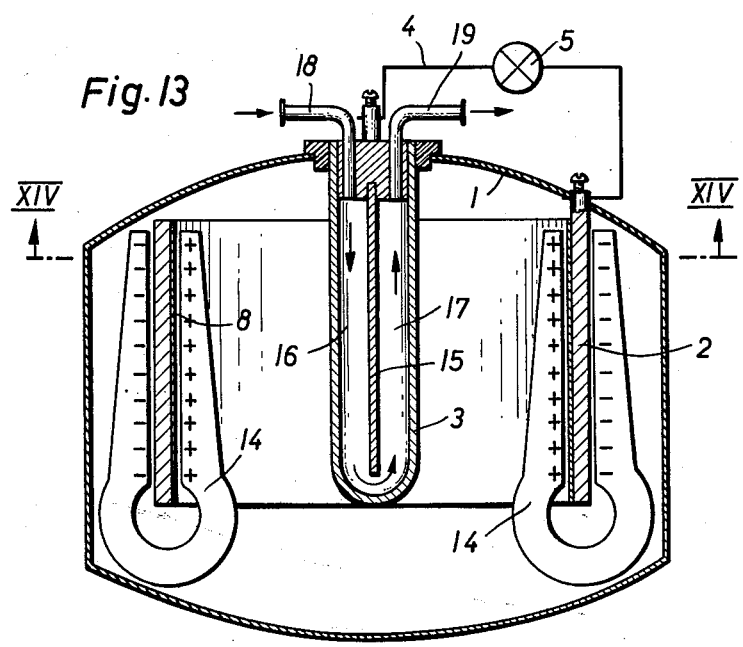
FIG. 13 is still another embodiment of the invention with cooled anode and horseshoe-shaped design of the electrets.
Figure 14:
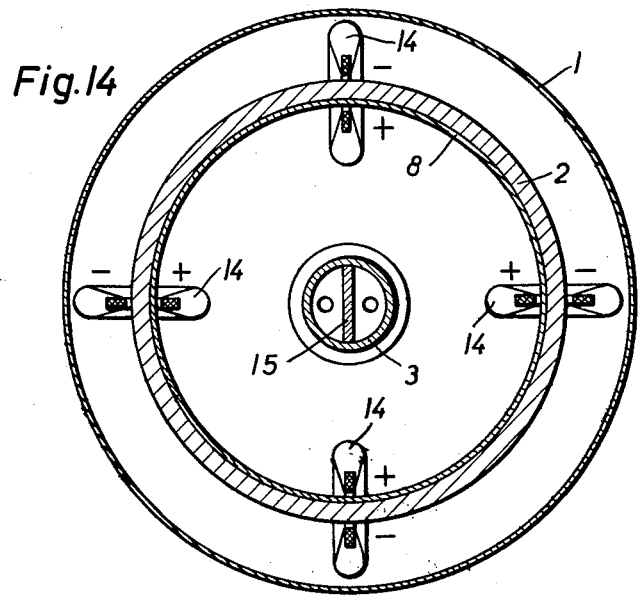
FIG. 14 is a section taken along the line XIV—XIV of FIG. 13.

A further modification of the invention is shown in FIGS. 13 and 14. Those parts of this embodiment which correspond to similar parts in the previously described arrangements, are, therefore, designated with the same reference numerals. This applies also to the cooled anode 3. According to the embodiment of FIGS. 13 and 14, the electrets 14 are of horseshoe shape and have their positive pole in engagement with the inner side of cathode 2. The device according to FIGS. 13 and 14 operates in the same manner as the devices of FIGS. 8 to 12.

For the sake of clarity, the cathodes 2 are shown in FIGS. 10 to 14 independently of the high vacuum container 1 while the heat exchanger fins forming part of the cathode 2 have likewise been omitted. But it is understood that the cathode 2 may be provided with such heat exchanger fins or the like.

The arrangement described above may also be so designed that the above mentioned effects, namely to act as current generator and to act as cooling or refrigerating machine, may be employed simultaneously.

Instead of the above mentioned cooling devices for the anode, it is, of course, possible according to the specific conditions of operation involved, especially the temperature difference and the respective temperatures, to employ other cooling devices known per se as for instance the so-called evaporation cooling.

It is, of course, to be understood that the present invention is, by no means, limited to the particular constructions shown in the drawings but also comprises any modifications within the scope of the appended claims.

What I claim is:

1. In an arrangement for converting heat into electric energy: an annular cathode, a rod-like anode arranged in spaced insulated relationship with regard to said cathode and on the axis thereof, a highly evacuated container confining said cathode and said anode and comprising means for absorbing heat and conveying the same to said cathode, conductor means electrically connecting said cathode in circuit with said anode, and means arranged between said anode and said cathode and located near the latter for enhancing electron flow between the cathode and anode, said means being insulated from both said anode and said cathode.

2. In an arrangement for converting heat into electric energy: a substantially cylindrical cathode, a rod-shaped anode arranged in spaced insulated relationship with regard to said cathode and located in substantially the axial area of said cathode, a highly evacuated container confining said cathode and said anode and having its outside provided with means for absorbing heat and conveying the same to said cathode, conductor means electrically connecting said cathode in circuit with said anode, and a positive charge carrier arranged between said anode and said cathode and located near the latter, and insulated from both the anode and cathode.

3. In an arrangement for converting heat into electric energy: a cylindrical cathode, a rod-like anode arranged in spaced insulated relationship with regard to said cathode on the axis thereof, a highly evacuated container confining said cathode and said anode and comprising means for absorbing heat and conveying the same to said cathode, said cathode having that surface thereof which faces said anode provided with a coating for facilitating the emission of electrons, conductor means electrically connecting said cathode in circuit with said anode, and a positive charge carrier arranged between said anode and said cathode and located near the latter, and insulated from both said anode and said cathode.

4. An arrangement according to claim 3, in which said coating consists of cesium oxide.

5. In an arrangement for converting heat into electric energy: a substantially cylindrical highly evacuated container having its inner side designed as cathode and having its outside provided with means for absorbing heat and conveying the same to said cathode, a rod-like anode arranged in spaced insulated relationship with regard to said cathode, conductor means electrically connecting said cathode in circuit with said anode, a grid arranged between said anode and said cathode and located near the latter, and insulating cover means surrounding said grid.

6. An arrangement according to claim 5, in which the outside of said container is provided with radially extending fins.

7. In an arrangement for converting heat into electric energy: a cylindrical cathode, a rod-like anode arranged in spaced insulated relationship with regard to said cathode on the axis thereof, a highly evacuated container confining said cathode and said anode and comprising means for absorbing heat and conveying the same to said cathode, conductor means electrically connecting said cathode in circuit with said anode, grid means forming a positive charge carrier and being arranged between said anode and said cathode near the latter, and a voltage source having one terminal connected to said grid means and having another terminal connected to said cathode.

8. An arrangement according to claim 7, in which said grid means is provided with an insulating cover engaging said cathode.

9. An arrangement according to claim 7, in which said grid means is provided with an insulating cover only slightly spaced from said cathode.

10. In an arrangement for converting heat into electric energy: a cylindrical cathode, a rod-like anode arranged in spaced insulated relationship with regard to said cathode on the axis thereof, a highly evacuated container confining said cathode and said anode and comprising means for absorbing heat and conveying the same to said cathode, conductor means electrically connecting said cathode in circuit with said anode, and electret means forming a positive charge carrier and arranged between said anode and said cathode, the positive terminal of said electret means being located between said anode and said cathode near the latter.

11. In an arrangement for converting heat into electric energy: a cylindrical cathode, a rod-like anode arranged in spaced insulated relationship with regard to said cathode on the axis thereof, a highly evacuated container confining said cathode and said anode and comprising means for absorbing heat and conveying the same to said cathode, conductor means electrically connecting said cathode in circuit with said anode, a useful current consumer interposed in said conductor means, a positive charge carrier arranged between said anode and said cathode and located near the latter, and insulating cover means surrounding said charge carrier.

12. In an arrangement for converting heat into electric energy: a cylindrical cathode, a rod-like anode arranged in spaced insulated relationship with regard to said cathode on the axis thereof, a highly evacuated container confining said cathode and said anode and comprising means for absorbing heat and conveying the same to said cathode, a medium to be cooled surrounding said container, conductor means electrically connecting said cathode in circuit with said anode, a positive charge carrier arranged between said anode and said cathode and located near the latter, and insulating cover means surrounding said charge carrier.

13. In an arrangement for converting heat into electric energy: a cylindrical cathode, a hollow rod-like anode arranged in spaced insulated relationship with regard to said cathode on the axis thereof, said cathode being provided with means for passing a cooling medium therethrough, a highly evacuated container confining said cathode and said anode and comprising means for absorbing heat and conveying the same to said cathode, conductor means electrically connecting said cathode in circuit with said anode, a positive charge carrier arranged between said anode and said cathode and located near the latter, and insulating cover means surrounding said charge carrier.

14. In an arrangement for converting heat into electric energy: a substantially cylindrical cathode, a hollow rod-like anode arranged in spaced insulated relationship with regard to said cathode and located substantially in the axial area of said cathode, partition means arranged within said anode and extending in the direction of the longitudinal axis thereof so as to divide the interior of said hollow anode into two interconnecting chambers, first conduit means connected to one of said chambers for introducing a cooling medium thereinto, second conduit means connected to the other chamber for discharging said cooling medium therefrom, said chambers communicating with each other only at a point remote from the connecting points of said chambers with said first and second conduit means, a highly evacuated container confining said cathode and said anode and comprising means for absorbing heat and conveying the same to said cathode, conductor means electrically connecting said cathode in circuit with said anode, a positive charge carrier arranged between said anode and said cathode and located near the latter, and insulating cover means surrounding said charge carrier.

References Cited in the file of this patent
UNITED STATES PATENTS

| | | |
|---|---|---|
| 2,881,384 | Durant | Apr. 7, 1959 |
| 2,915,652 | Hatsopoulos et al. | Dec. 1, 1959 |